Oct. 19, 1926. 1,603,647
F. STENDER
MACHINE TOOL
Original Filed Nov. 3, 1920 2 Sheets-Sheet 1
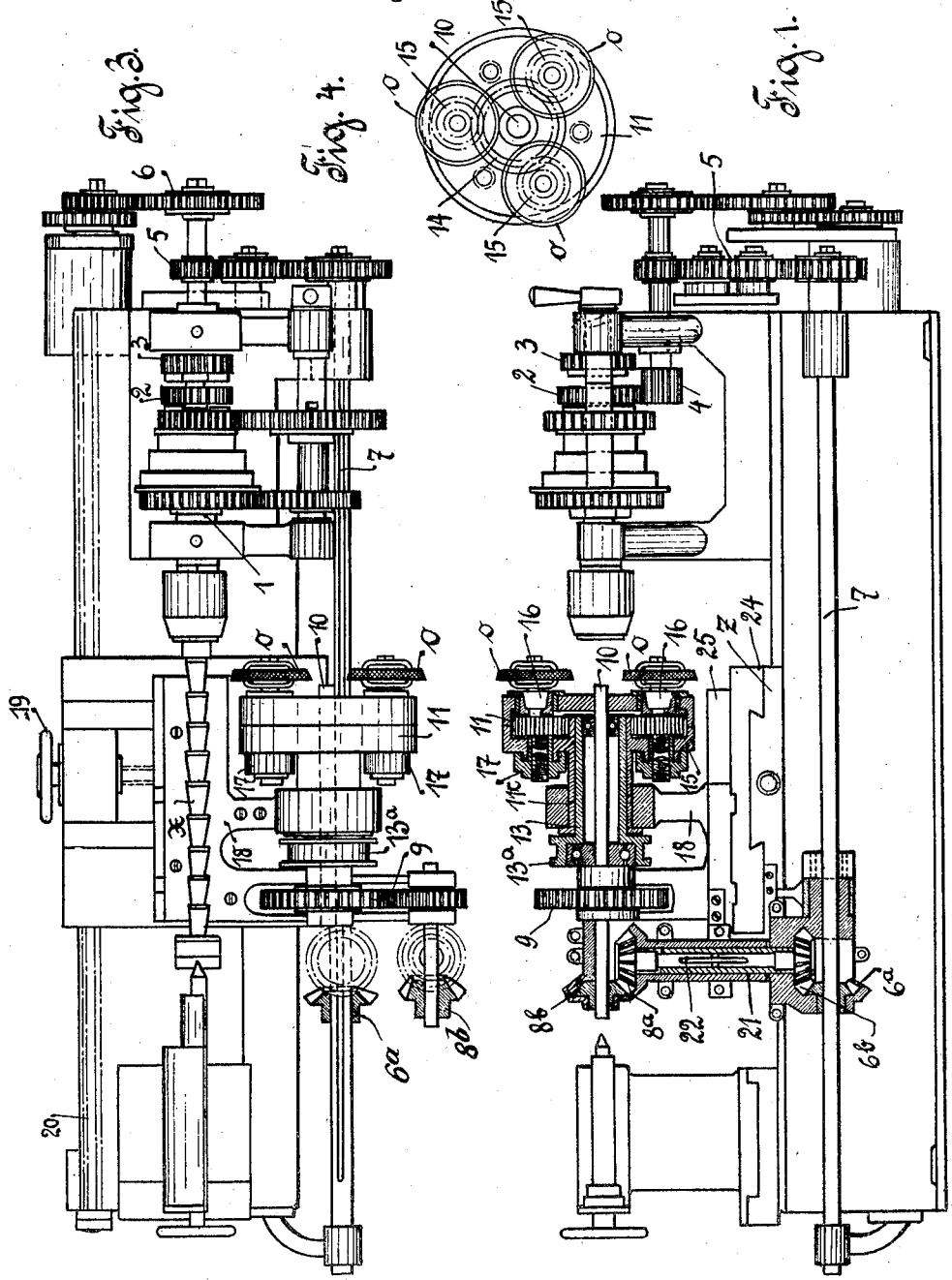
Inventor
Friedrich Stender

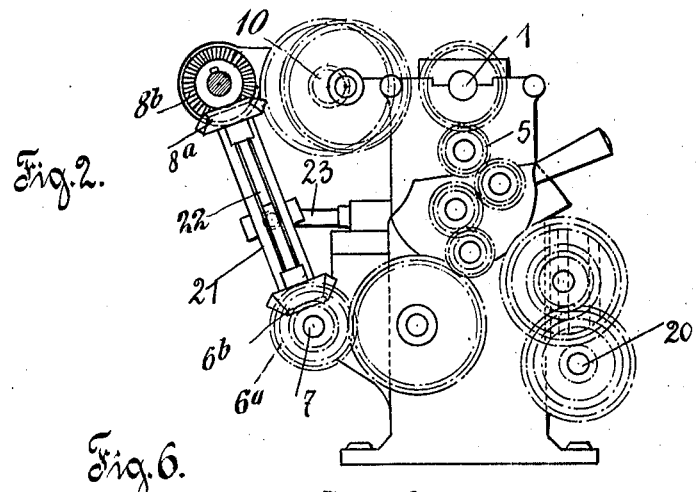
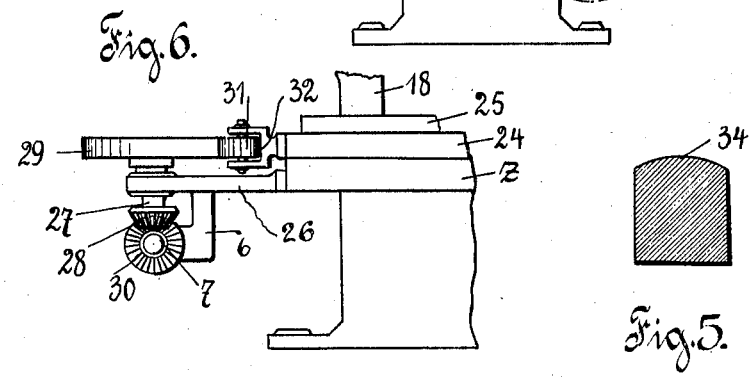
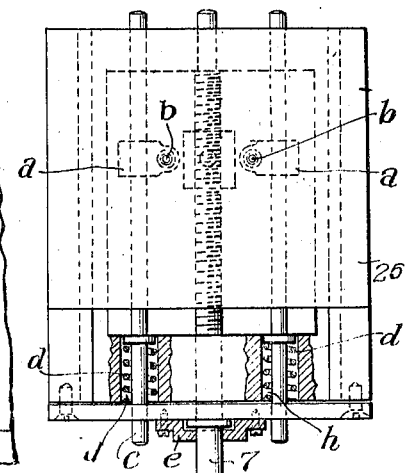
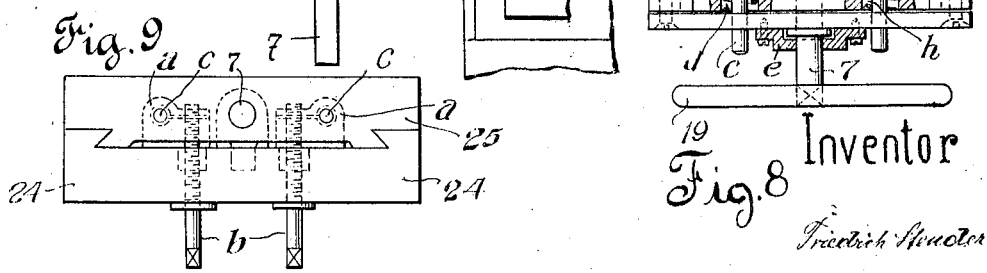

Patented Oct. 19, 1926.

1,603,647

UNITED STATES PATENT OFFICE.

FRIEDRICH STENDER, OF ESSEN, GERMANY.

MACHINE TOOL.

Application filed November 3, 1920, Serial No. 421,512, and in Germany July 22, 1919. Renewed September 9, 1926.

My invention refers to machine tools and more especially to a machine on which edged work pieces of any desired material, such as metal, wood, or the like, can be produced and finished by milling, grinding, or in some other manner. In this machine the work piece as well as the tool carrier including the tool, are rotated in a well known manner, the tool thus, under the influence of certain ratios in the number of revolutions of the rotating factors, produces either straight surfaces, or surfaces curved in a concave or convex shape in a more or less considerable degree, and sharp edges on the work piece.

According to my invention the tool carrier is provided with several tool holders in which the tools are inserted so as to be detachable, the said tool holders being distributed along the circumference of the tool carrier. The method of working of the machine can be defined by the number of tools and their arrangement, i. e. it is possible to change over to the manufacture of pieces with a different number of edges by simply altering the number of tools working, and in general, it is not necessary to alter the number of revolutions of the machine. Moreover it is advisable to make the tool carriers including the tools, rotatable around their own axis besides, so as to be able to perform this kind of machining in the most satisfactory manner, milling cutters, or rotating discs fitted with turning-tools, or grinding wheels, or the like, being employed as tools.

This machine tool presents particular advantages for the manufacture and machining of scraping out cutters and mandrels owing to its producing cutting teeth of uniform strength and furthermore on account of this machine allowing of another absolutely accurate finishing after the hardening process has taken place.

Irregular angular pieces can also be produced on this machine, such as for instance, hexagonal shafts one lateral surface of which is convex. In this case the machine tool is provided with a template rotating with the same speed as the tool carrier and shifting the support on which the tool carrier is arranged, whenever a deviation from the regular machining shall take place.

In the drawings affixed to this specification and forming part thereof, a machine tool embodying my invention is illustrated by way of example. In the drawings—

Fig. 1 is a front view, partly in longitudinal section.
Fig. 2 is a side view.
Fig. 3 a plan view.
Fig. 4 is a side view of the tool carrier.
Fig. 5 is a cross-section of a piece to be worked.
Fig. 6 is a side view of the arrangement of the template.
Fig. 7 is a plan view thereof.
Fig. 8 is a plan view and
Fig. 9 is a rear end view showing the support drawn to a larger scale.

The spindle 1 driving the work piece, is provided with a stepped pulley as employed on lathes and driving the spindle by means of a back gear. A toothed wheel 2 fitted loosely on the shaft, is employed for transmitting the power to the tool holder, the arrangement being such that the said toothed wheel 2 can either be coupled with the toothed wheel of the stepped pulley or with a toothed wheel 3 fixed on the shaft, the toothed wheel 2 thereby being made to rotate with varying numbers of revolutions according to the way in which it is thrown into gear. The toothed wheel 2 drives the wheel 4 and thus, through the agency of the train of gears 5 comprising change wheels, also the shaft 7, whence the motion is transmitted to the spindle 10 of the tool carrier 11 by means of the pairs of bevel spur wheels 6ª, 6ᵇ, and 8ª, 8ᵇ and the spur wheel gear 9. The tool carrier 11 consists of a casing composed of two parts and arranged in the bearing block 18 of a support, and is made to enclose the toothed wheels 15 with the shafts 16 of the tools (grinding wheels, milling cutters, or the like inserted therein.) Caps 17 are screwed on the tool carrier 11 and contain adjusting grub screws acting as abutments which prevent the toothed wheels from rubbing on the walls of the casing. These toothed wheels 15 are driven by means of a bushing 13 provided with a toothed rim through which it engages with the toothed wheels, the bushing 13 being arranged in ball bearings and provided with a belt pulley 13ᵃ at its other end. The drive of this bushing is independent of the other drives of the machine.

The tubular casing 21 containing the extensible shaft 22 of the pairs of bevel spur wheels 6ᵇ and 8ᵃ, which shaft consists of two slotted halves embracing a central rib 22ᵃ provided in the sleeve 21, can be swung out around the shaft 7. The casing is connected to the cross slide 24 of the support z by means of a link arm 23, the support being shiftable through the agency of a hand wheel 19. The simple gear transmission between the shafts 7 and 10 is thus maintained, if the tools are brought up to the work piece by shifting the support. The longitudinal shifting of the support is effected in the usual manner by means of a longitudinal shaft 20. The bearing blocks 18 are not arranged directly on the bed 24, but on a plate 25 which is again shiftable on the former and which can be locked.

Assuming a gear ratio of 1:2 between the spindle 1 of the work piece, and the spindle 10 of the tool carrier, pieces with any even number of edges, can, for instance, be produced on this machine. If, for example, two tools are inserted in the tool carrier, quadrangular pieces are produced; if three tools are inserted, hexagonal pieces result, etc. In this case each tool works two surfaces located opposite one another. For the production of triangular bodies only one tool would have to be employed, whilst the gear ratio would be set at 1:3.

If it is desired to stagger the teeth of different surfaces in regard to one another when manufacturing mandrels, it is only necessary to stagger the tools in the tool carrier axially in regard to one another for instance by inserting washers of various thickness.

In order to be also able to produce pieces with irregular cross sections on this machine, the machine may also be provided with a device which periodically shifts the cross slide of the support together with the tool carrier by means of a template. The spindle of the hand wheel 19 is then removed from the support and replaced by springs which tend to shift the support in such a way as to prevent the tools from contacting with the work piece. To this end two spindles c can be inserted in borings h, having mounted thereon clamping chucks a which can be tightened by means of screw spindles b (Figs. 8 and 9). If the support shall be moved by aid of the main spindle, the chucks are released. However, if the template is called upon to effect the movement, the abutment plate e, which holds the spindle 7 in place, is loosened, the spindles b are tightened and the springs d act towards pressing the part 25 against the template. The template driven by the shaft 7, then counteracts the effect of these springs and adjusts the support so as to bring the tools into their correct position with regard to the work piece. If, for example, the cross-section illustrated in Fig. 5 is to be produced, the device illustrated in a diagrammatical manner in Figs. 6 and 7, is employed.

The support z is fitted with the arm 26 containing the vertical shaft 27 in a bearing, this shaft 27 being provided with the bevel spur wheel 28 and the template 29. The bevel spur wheel 28 engages with the bevel spur wheel 30 which is arranged shiftably on the shaft 7 and is also supported in a bearing provided on the arm 26. The adjustable roller 31 of the arm 32 attached to the cross slide 24, presses against the template. In this case the cross slide 24 is shifted on the support z by springs in such a manner that the roller 31 is in permanent contact with the template 29. In order to provide for the tool carrier being adjustable also by hand, the plate 25 which is provided with the bearing blocks 18 of the tool carrier, can be shifted on the bed slide 24 by means of a spindle. The springs and spindles are not shown in the drawings.

As long as the circular part of the template 29 touches against the roller 26, the slide with the tool carrier is not shifted and the work on the work piece, i. e. the shaping of the lateral surfaces and edges, is performed in the manner described above. When, however, the roller 31 reaches the recessed part 33 of the template 29, the slide of the support including the tool carrier, is withdrawn from the work piece in such a way as to allow of the formation of the convex lateral surface 34 shown in Fig. 5.

I claim:

1. In a machine tool in combination, means for causing rotation of the work piece, a tool adapted to revolve about an axis substantially parallel to the axis of rotation of the work piece and means for imparting to said tool a planetary motion.

2. In a machine tool in combination, means for causing rotation of the work piece, a rotary tool carrier adapted to revolve about an axis substantially parallel to the axis of rotation of the work piece and a tool on said carrier adapted to revolve about an axis substantially parallel to the axis of rotation of said carrier.

3. In a machine tool in combination, means for causing rotation of the work piece, a tool carrier, a tool on said carrier adapted to revolve about an axis substantially parallel to the axis of rotation of said carrier and means for causing rotation of said tool independently of said carrier.

4. In a machine tool in combination, means for causing rotation of the work piece, a tool carrier adapted to revolve about an axis substantially parallel to the axis of rotation of said work piece, and a plurality of rotary tools on said carrier adapted to revolve independently of said carrier about axes substantially parallel to the axis of rotation of said carrier.

5. In a machine tool in combination, a work piece shaft, a tool carrier shaft adapted to be driven by said work piece shaft, a tool carrier on said tool carrier shaft, a rotary tool on said carrier, a bushing on said tool carrier shaft, a toothed rim on said bushing, a toothed wheel on said tool in gear with said rim and means for turning said bushing independently from said shaft.

6. In a machine tool in combination, means for causing rotation of the work piece, a rotary tool carrier, a rotary tool disposed on said carrier, a template adapted to rotate in synchronism with said tool carrier and a cross-slide carrying said tool carrier and adapted to be displaced relatively to said work piece by said template.

In testimony whereof I affix my signature.

FRIEDRICH STENDER.